United States Patent [19]

Jones et al.

[11] Patent Number: 4,633,088

[45] Date of Patent: Dec. 30, 1986

[54] REVERSE SUM QUENCH MEASUREMENT USING A LIQUID SCINTILLATION COUNTER

[75] Inventors: Donald K. Jones, Schaumburg; John D. Tomisek, Evergreen Park; Harry M. Young, Barrington, all of Ill.

[73] Assignee: Packard Instrument Co., Inc., Downers Grove, Ill.

[21] Appl. No.: 721,265

[22] Filed: Apr. 8, 1985

[51] Int. Cl.[4] .............................. G01T 1/204
[52] U.S. Cl. ................. 250/369; 250/361 R; 250/362; 250/363 R; 250/364
[58] Field of Search ............... 250/362, 369, 328, 364, 250/361 R; 364/496, 498, 499, 525; 250/361 C, 363 R, 366

[56] References Cited

U.S. PATENT DOCUMENTS 4,528,450  7/1985  Valenta ............................. 250/362
4,555,629  11/1985 Everett et al. ...................... 250/362

OTHER PUBLICATIONS

"The TRI-CARB ® 460C Automatic Liquid Scintillation System" Operation Manual, Packard Instrument Co., Inc., Publication No. 169-2185/B (U.S.A. 1980).

*Primary Examiner*—Craig E. Church
*Assistant Examiner*—Constantine Hannaher
*Attorney, Agent, or Firm*—Leydig, Voit & Mayer

[57] ABSTRACT

Apparatus and a method for determining a quench-indicating parameter of a test sample utilizing a liquid scintillation counter are disclosed. The number of counts in a spectrum resulting from subtraction of a spectrum generated without an external source of radiation from a spectrum generated with an external source of radiation is utilized. The total number of counts is cumulatively summed from a higher energy level to a lower energy level and a curve representing this sum is generated. A portion of this curve is fitted with a function such as a straight line and the intersection of that function with the zero count axis is the intersection energy level which is an indication of the measure of quench of the test sample.

11 Claims, 3 Drawing Figures

REVERSE SUM QUENCH MEASUREMENT USING A LIQUID SCINTILLATION COUNTER

DESCRIPTION

Field Of The Invention

The invention relates to apparatus and the method useful for determining a quench-indicating parameter of a radionuclide test sample using a liquid scintillation counter. More specifically the present invention is directed to summing the number of counts in a reverse direction of a distribution spectrum, fitting a function such as a straight line to a curve generated by summing the counts and projecting that function to the zero count axis to determine a quench-indicating parameter.

BACKGROUND OF THE INVENTION

Liquid scintillation counting is a generally known and widely used technique for the measurement of low energy beta emitting radionuclides in addition to gamma and alpha emitters. The liquid scintillation counter is utilized to make quantitative measurements of radioactivity by incorporating a radio-labeled analyte into solution with a liquid chemical medium capable of producing photons resulting from the kinetic interactions of nuclear decay products. There are different radionuclides, both man-made and naturally occurring, which can be experimentally employed to illustrate the molecular dynamics of a particular model by measuring their distributions in various systems. It is often desirable to use multiple radionuclides in the same experiment to follow different distributions in the same system simultaneously.

The energy of the beta particles ranges from zero energy to the maximum energy ($E_{max}$) for that radionuclide. A pulse height energy distribution spectra may be recorded for the solution being analyzed. When the solution being analyzed contains a mixture of beta emitters there is an overlap of the spectra from each emitter.

Tritium has developed immense importance in various applications wherein radio-labeled components are utilized. By dissolving a sample containing the tritium in a mixture of aromatic solvent containing an organic scintillator, energy from the beta decay is transferred with reasonable efficiency to the scintillator which emits multiple photons of light proportional to energy of the beta particle. The light is detected by sensitive photomultiplier tubes. In a normal state these photomultiplier tubes have a characteristic dark noise which occurs upon the spontaneous emission of an electron within the tube. The dark noise consists of pulses generating approximately a single photon response. Thus, by utilizing multiple photomultiplier tubes and by requiring a coincidental event, beta emitters can be measured while minimizing the background. The higher the energy of the beta particle, the more photons will be produced over selected time intervals such as 20–50 nanoseconds. All photons produced within that interval are considered a pulse. The combined amplitude of the photons is known as the pulse height. The range of pulse heights as shown in FIG. 1 is a distribution of energies ranging from zero energy rising to a maximum and tailing off to the maximum energy of the beta emitting radionuclide. This distribution is known as the pulse-height energy distribution spectra.

Another phenomenon of interest to a liquid scintillation user is the phenomenon of quenching. All energy created by the beta particle is not transmitted to the fluor or otherwise is unfortunately not dissipated into the production of light. The adding of sample material to the scintillation solution introduces molecules which are not capable of producing light. The energy of the ejected beta particles therefore may be dissipated in the excitation of solvent molecules as well as by transferring energy to sample molecules. Since some of the energy transferred to sample molecules is not utilized to produce photons of light, it is not measured by the photomultiplier tubes and not recorded. This chemical quenching results in the spectrum of pulse amplitudes being smaller than the theoretical spectrum for an unquenched sample. Additionally, there is quenching caused by optical effects such as color and/or turbidity which is referred to as optical quenching.

The relative quenching of a sample may be determined by using a quench-indicating parameter (QIP) such as the Spectral Index of a Sample (SIS) or the Spectral Index of the External Standard (SIE). These methods involve counting the sample either with or without a gamma radiation source present adjacent the sample vial. The gamma radiation source generates Compton electrons in the sample solution which behave in a similar manner to beta particles. When quenching is present, the pulse height energy distribution spectra from the gamma radiation generated events will be compressed towards a lower apparent energy. By measuring the spectra change using a quench-indicating parameter (QIP) such as External Standard Ratio (ESR), Spectral Index of External Standard (SIE), H number, etc., one may obtain the degree of quenching.

Another indication of the degree of quenching is the highest energy level of the pulse-height energy distribution spectra. However, determining this endpoint energy level is difficult to accomplish in a highly accurate manner. Pulse-height energy distribution spectra tend to be uneven and occasional results fall outside the expected realm of results. The selection of the highest energy pulse recorded is not an accurate means for determining an endpoint of the spectra.

The degree of quenching of a sample is used for many purposes. To determine the actual disintegrations per minute (DPM) of a sample it is necessary to know the efficiency of the liquid scintillation counter under the particular conditions. Once the efficiency is known the actual number of counts per minute (CPM) as regarded by the counter is divided by the efficiency to determine the actual disintegrations per minute (DPM) of the sample.

For a given sample, the relationship of the degree of quenching can be equated to the counting efficiency such that the efficiency and consequently the actual disintegrations per minute may be determined from the counts per minute (CPM) based upon the degree of quenching detected.

SUMMARY OF THE INVENTION

It is an object of the present invention to provide a method and apparatus for determining a quench-indicating parameter.

It is a further object of the present invention to provide a reliable method for determining the endpoint of the energy distribution spectrum.

It is another object of the present invention to provide means utilizing existing scintillation counting data for accurately determining a quench-indicating parameter.

Other objects will be apparent from the description to follow in the appended claims.

The above objects are achieved according to a preferred embodiment of the invention by the provision of a scintillation counting system for use with a test sample containing one or more radioactive isotopes and a scintillator which converts energy emitted by radioactive decay of the isotopes into an optical event. The system includes transducer means for converting each optical event into an electrical pulse proportional thereto, elimination means connected to said transducer means for eliminating pulses which are not related to the decay of an isotope, quantizing means connected to the elimination means for identifying a parameter of each pulse passed by the elimination means, and means for determining a quench-indicating parameter including processing means connected to said quantizing means for (a) receiving and storing parameter data related to each nuclear event, (b) for determining a spectrum of the number of pulses at various energy levels, (c) for ascertaining a curve of the cumulative area (number of counts) under the spectrum starting at the high energy end of the spectrum, (d) for fitting a function such as a straight line to the curve, and (e) for locating the endpoint of the spectrum by identifying the location where the straight line intersects the zero axis for the number of pulses or number of counts per minute.

Additionally, disclosed is a method of determining a quench-indicating parameter using a liquid scintillation counter for a sample wherein the liquid scintillation counter has counted and stored data representative of the number and energy level of various radioactive decay events. The method includes calculating a number of events-energy level distribution spectrum for the sample, determining a curve representative of the cumulative sum of the area under the spectrum beginning at the high energy end of the spectrum, fitting a function such as a straight line to a portion of the curve, locating an intersection energy level which is the energy level at which the function intersects the axis representing a zero number of events, and computing the quench-indicating parameter as a function of the intersection energy level.

The invention may further be expressed as the method using a liquid scintillation counter of measuring the degree of quench of a sample which includes collecting the spectrum of the sample with and without an external radiation source present, said spectrum including the number of counts for each energy level. The method further includes subtracting on an incremental basis the spectrum from the sample without the external radiation source being present from the spectrum with the external radiation source being present to determine a differential spectrum, summing the number of counts in the differential spectrum on a cumulative basis from maximum energy to minimum energy, fitting a function such as a straight line to a portion of a curve generated by the step of summing, and determining the degree of quench as a function of the location of the intersection of a projection of the straight line with a line representative of a zero count level.

DESCRIPTION OF THE PREFERRED EMBODIMENT

The invention will be described herein with reference to a specific technique useful with liquid scintillation counting for determining a quench-indicating parameter of a test sample. It is to be understood that this apparatus and method has like applicability to similar situations and is not necessarily limited to liquid scintillation counting.

Additionally, as used herein a curve is drawn which represents the cumulative sum of the area under the spectrum or the cumulative sum of the number of counts making up the spectrum. These two designations of sum of the area under the spectrum and sum of the number of counts are used interchangeably and shall mean the same thing.

Figure 1:
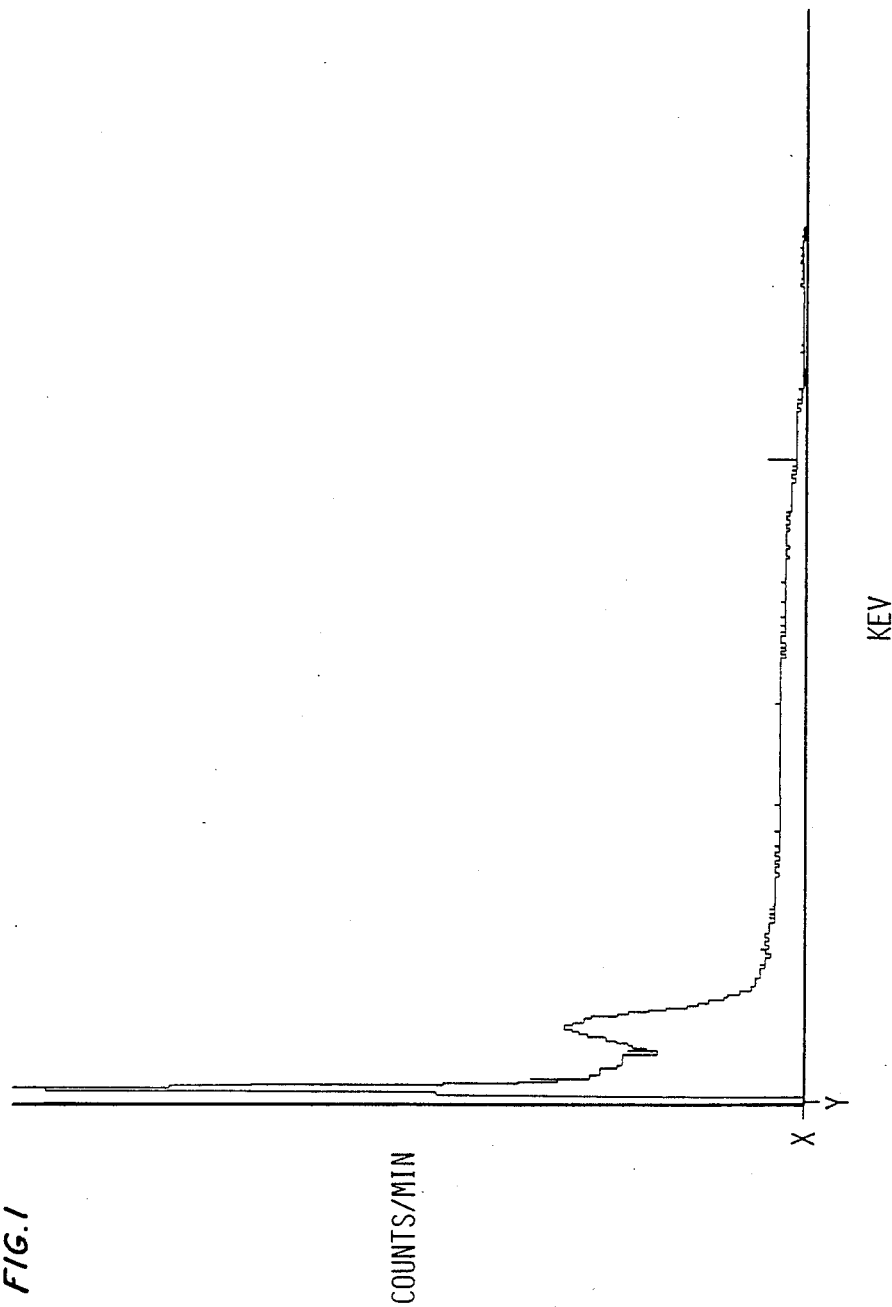
FIG. 1 is a graph of the number of counts per minute versus the energy level detected for each count differential spectrum (spectrum with external source present minus spectrum without external source present) as recorded by a liquid scintillation counter.

FIG. 1 is a typical pulse-height energy differential spectrum of a test sample. This spectrum is a plot of the number of counts per minute on the Y ordinate versus the energy of each count expressed in kiloelectron volts on the X abcissa or axis. As can be seen there are extreme peaks in the number of counts per energy level at the lower end of the spectrum and the upper end of the spectrum tails off gradually. It may also be seen from FIG. 1 that the number of counts at specific energy levels gets very small at the higher energy end of the spectrum and that there is significant disparity at the number of counts at each energy level towards the higher energy end of the plot.

Since the endpoint of the spectrum is representative of the amount of quenching of the sample, it is important to identify where that endpoint is. When a sample is quenched, the highest energy of the spectrum is displaced towards the lower energy on the graph. In other words should a radioisotope having a high energy of, for instance, 156 kiloelectron volts as for Carbon$_{14}$, depending upon the degree of quenching, the maximum energy level of the spectrum would be some level less than 156 kiloelectron volts such as 112 kiloelectron volts. By determining what this highest energy point is of the quenched spectrum, it is possible to determine the degree of quenching of the sample. It may be seen from viewing FIG. 1, that it is difficult to pick an exact point at which the spectrum terminates.

Figure 2:
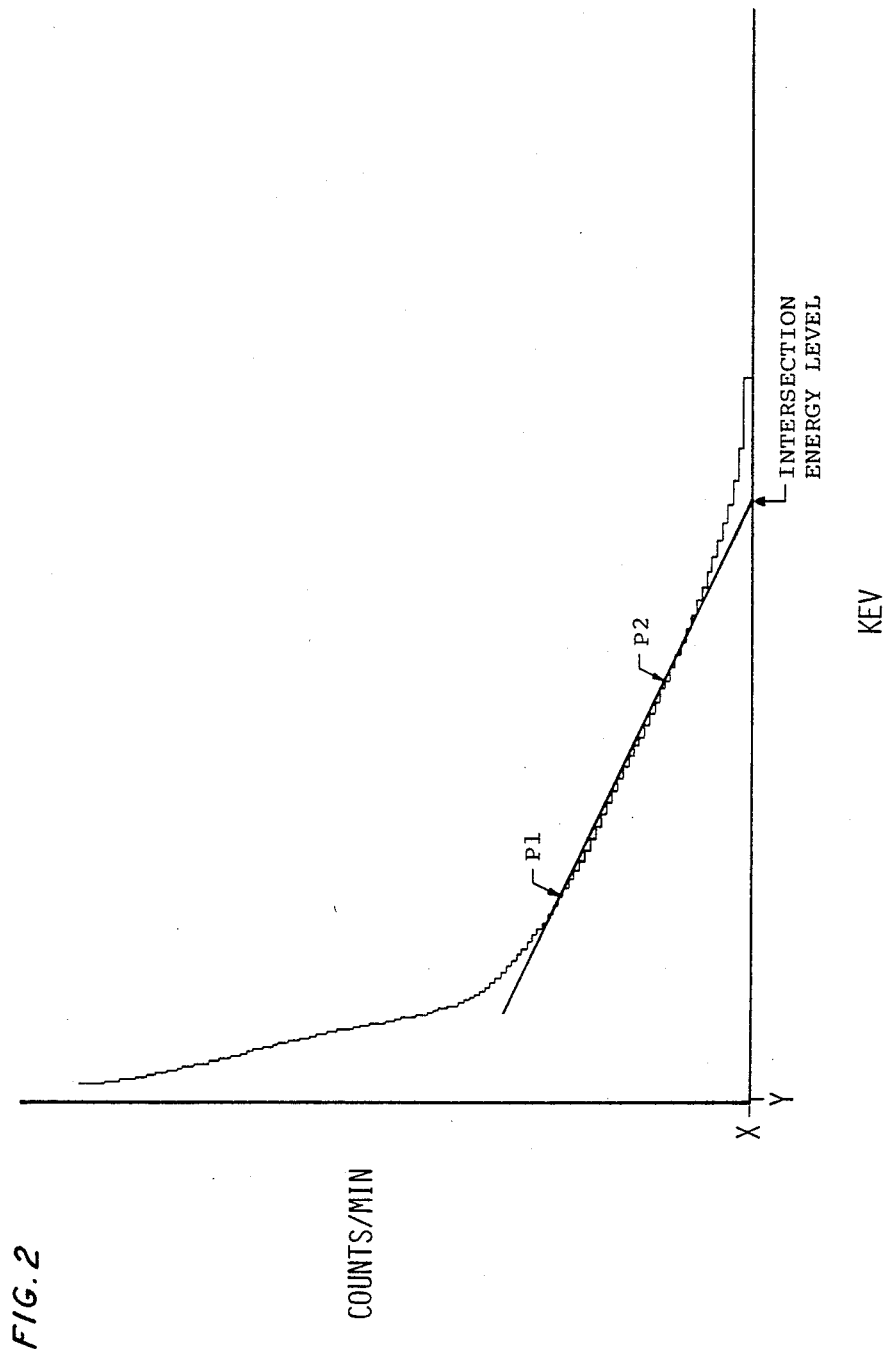
FIG. 2 is a graph of the number of counts per minute versus the energy level formed by cumulatively summing the number of counts of the graph of FIG. 1 in a direction from maximum energy to minimum energy.

FIG. 2 is a graph plotted with the same abscissa and ordinate as in FIG. 1 of counts per minute and kiloelectron volts. FIG. 2 is a graph having a curve representative of the cumulative total of counts from FIG. 1 as the number of counts is summed from the higher energy to lower energy direction. In other words, the total number of counts moving from the right to the left as shown in FIG. 1 is represented by the curve as shown in FIG. 2. This curve obviously increases dramatically as the lower energy levels are approached.

Points P1 and P2 are labeled on FIG. 2 and it is between these points that a function such as a straight line is fitted to the curve. It may be seen that the curve is substantially straight between these two points. It has been found empirically that these two points represent respectively approximately 20% of the total number of counts and 10% of the total number (sum) of the counts of the spectra beginning at the higher energy end of the spectra. A function such as a straight line may be fitted between these two points by any known curve-fitting technique or a straight line may be simply drawn therethrough. It should be noted that this function intersects the zero count axis or X axis or abscissa at a point which is labeled intersection energy level. It is this point that is used as a measure of quench of the test sample.

By utilizing the summation of the total number of counts in the spectrum the entire spectrum is utilized to determine this intersection energy level or at least that portion of the spectrum up to the point selected. By selecting points representing 10 and 20% or any approximation thereof of the total number of counts, it is with a high statistical accuracy that the intersection level may be determined appropriately for all identical samples.

It is, of course, to be understood that selections at points P1 and P2 can be made on other bases. The selection of these points is done to identify an area of this reverse summation curve which is approximately linear and which may be easily, accurately and repeatedly fitted with a straight line. It is, of course, the projection of the function and the intersection of that projection with the X axis which determines the intersection energy level which is a function of the measure of quench. The value determined at this intersection energy level may be multiplied by any correction factor desired to achieve an appropriate number representing quench for this particular test sample. In this manner the degree of quench of a test sample may be determined.

Figure 3:
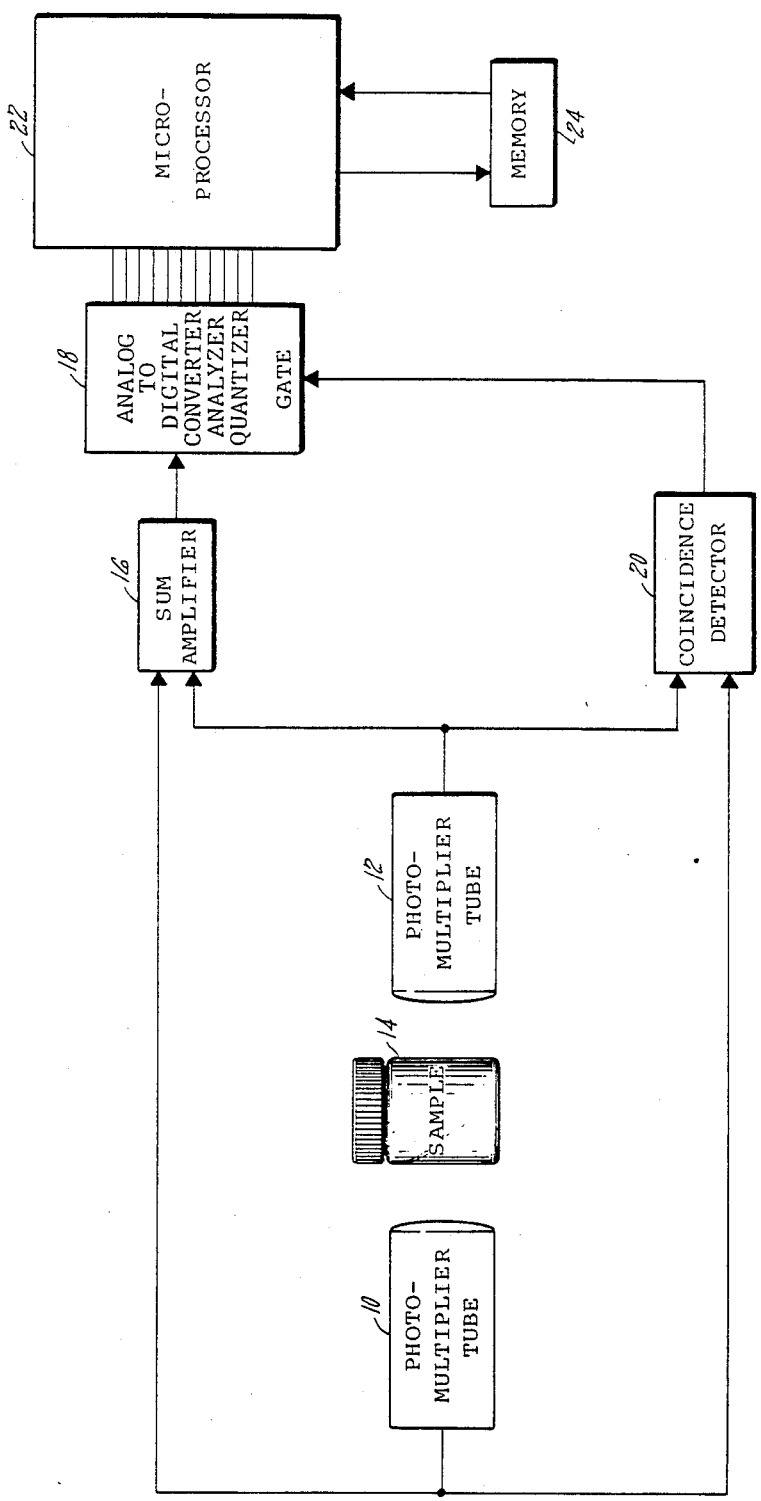
FIG. 3 is a diagrammatic view of a liquid scintillation counter.

FIG. 3 is a block diagram of a typical electronic liquid scintillation counter. Such a counter could be a Packard Tricarb 4000 Series Liquid Scintillation Counter. It may be seen in FIG. 3 that the system typically includes a first photomultiplier tube 10 and a second photomultiplier tube 12 which are positioned with an overlapping field of view. The material to be assayed is placed in a sample container 14 which, in the counting mode, is loaded into a centrally-disposed position relative to photomultiplier tubes 10 and 12. A summing amplifier 16, connected to the output of each of the photomultiplier tubes, both combines the respective output signals and also increases the amplitude proportionately to the level observed by the photomultiplier tubes. An analyzer, quantizer analog-to-digital converter 18 is connected to the output of the sum amplifier 16 to quantize the signal level and to generate a digital number which identifies the specific magnitude of each received pulse. A coincidence detector 20 is provided to distinguish a scintillation event related to the radionuclide disintegration from unwanted background energy. In operation the coincident detector receives pulses from both photomultiplier tubes 10 and 12 and measures the time difference between the received pulses. If the second pulse is received within a predetermined length of time, or time differential window of the first, such an event is concluded to be related to the radioactive decay event. An enable signal is presented to the analog-to-digital converter 18 to simultaneously gate the combined pulse through to microprocessor 22. Of course, if a pulse is not received at each input of the coincidence detector within the time window, the analog-to-digital converter is not enabled so that no scintillation event is counted.

The digital number representing the counted nuclear event is received by microprocessor 22 and stored in memory 24 for subsequent use. Those skilled in the art will appreciate the aforegoing description as general in nature and could describe a number of different scintillation counting systems.

A particular advantageous feature of the herein reverse sum method of determining a quench-indicating parameter is that it is adapted for and well suited for implementation by existing scintillation counting systems. Thus a subroutine could be written and incorporated into the programming software of the microprocessor to implement a determination of a quench-indicating parameter as described. A subroutine in the nature described would merely implement the method steps as outlined in the appended claims. It is believed that the provision and implementation of such a subroutine would be within the knowledge of a person skilled in the art given the information as set forth in this application.

The invention has been described with reference to a particular embodiment, however, it may be understood by those skilled in the art that variations and modifications can be made within the scope of the invention.

We claim:

1. A scintillation counting system for use with a test sample containing one or more radioactive isotopes and a scintillator which converts energy emitted by radioactive decay of the isotopes into an optical event which comprises:
    transducer means for converting each optical event into an electrical pulse proportional thereto;
    elimination means connected to said transducer means for eliminating pulses which are not related to the decay of an isotope;
    quantizing means connected to the elimination means for identifying a parameter of each pulse passed by the elimination means; and
    means for determining a quench-indicating parameter including processing means connected to said quantizing means for (a) receiving and storing parameter data related to each nuclear event; (b) for determining a spectrum of the number of pulses at various energy levels; (c) for ascertaining a curve representing the cumulative area under the spectrum starting at the high energy end of the spectrum; (d) for fitting a function to the curve; and (e) for locating the endpoint of the spectrum by identifying the location where the function intersects the zero axis for the number of pulses.

2. The apparatus as set forth in claim 1 wherein the processing means comprises a microprocessor and wherein the quantizing means provides a digital signal for each pulse indicative of the energy level of that pulse.

3. The apparatus as set forth in claim 1 wherein the processing means further comprises means for identifying a suitable portion of the curve of the cumulative area under the spectrum and wherein the means for fitting a function to the curve includes means for fitting a function to the suitable portion of the curve.

4. The apparatus as set forth in claim 1 and further comprising:
    external radiation source means for supplying energy to the scintillator; and
    said processing means further acting to determine the spectrum of the sample with external radiation being supplied thereto and without external radiation being supplied thereto; and
    wherein the processing means for determining a spectrum further comprises means for determining a spectrum by incrementally subtracting the spectrum determined without the source of external radiation from the spectrum with the source of external radiation.

5. A method of using a liquid scintillation counter for determining a quench-indicating parameter of a sample wherein the liquid scintillation counter has counted and stored data representative of the number and energy level of various radioactive decay events which comprises the steps of:
   calculating a number of events-energy level distribution spectrum for the sample;
   determining a curve representative of the cumulative sum of the area under the spectrum beginning at the high energy end of the spectrum;
   fitting a function to a portion of the curve;
   locating an intersection energy level which is the energy level at which the straight line intersects the axis representing a zero number of events; and
   computing the quench-indicating parameter as a function of the intersection energy level.

6. The method as set forth in claim 5 wherein the scintillation counter includes a movable external source of radiation and wherein the step of calculating further comprises:
   storing the number of events for each energy level for the sample with the external source of radiation acting on the sample;
   storing the number of events for each energy level for the sample without the external source of radiation acting on the sample; and
   calculating a number of events-energy level distribution by subtracting the number of events for each energy level without the external source of radiation from the number of events for each energy level with the source of external radiation.

7. The method as set forth in claim 5 wherein the step of computing comprises multiplying the intersection energy level by a correction factor to obtain a quench-indicating parameter for the sample.

8. The method as set forth in claim 5 wherein the step of fitting a function includes identifying a suitable portion of the curve and fitting the function thereto.

9. The method as set forth in claim 8 wherein the suitable portion of the curve is that portion between about a point indicative of 10% of the total area under the spectrum and a point indicative of about 20% of the total area under the spectrum.

10. A method of using a liquid scintillation counter for measuring the degree of quench of a sample which comprises the steps of:
    collecting the spectrum of the sample with and without an external radiation source present, said spectrum including the number of counts for each energy level;
    subtracting on an incremental basis the spectrum of the sample without the external radiation source being present from the spectrum with the external radiation source being present to determine a differential spectrum;
    summing the number of counts in the differential spectrum on a cumulative basis from maximum energy to minimum energy;
    fitting a function to a suitable portion of a curve generated by the step of summing; and
    determining the degree of quench as a function of the location of the intersection of a projection of the function with a point representative of a zero count level.

11. The method as set forth in claim 10 wherein the step of fitting a function to a portion of the curve further comprises identifying the portion of the curve as a function of a selected percentage of the cumulative number of counts.

* * * * *